(12) United States Patent
Nunnink

(10) Patent No.: US 9,495,573 B2
(45) Date of Patent: Nov. 15, 2016

(54) LOW PROFILE ILLUMINATION FOR DIRECT PART MARK READERS

(71) Applicant: Laurens Nunnink, Simpleveld (NL)

(72) Inventor: Laurens Nunnink, Simpleveld (NL)

(73) Assignee: COGNEX TECHNOLOGY AND INVESTMENT CORPORATION, Mountain View, CA (US)

( * ) Notice: Subject to any disclaimer, the term of this patent is extended or adjusted under 35 U.S.C. 154(b) by 0 days.

(21) Appl. No.: 14/183,766

(22) Filed: Feb. 19, 2014

(65) Prior Publication Data

US 2015/0021396 A1    Jan. 22, 2015

Related U.S. Application Data

(63) Continuation of application No. 12/900,605, filed on Oct. 8, 2010, now Pat. No. 8,672,227, which is a continuation of application No. 11/019,763, filed on Dec. 21, 2004, now Pat. No. 7,823,789.

(51) Int. Cl.
  *G06K 7/10* (2006.01)

(52) U.S. Cl.
  CPC .................. *G06K 7/10732* (2013.01)

(58) Field of Classification Search
  USPC ............. 235/472.01, 462.25, 462.42, 462.43
  See application file for complete search history.

(56) References Cited

U.S. PATENT DOCUMENTS

| | | | |
|---|---|---|---|
| 2,357,378 A | 9/1944 | Benford | |
| 3,726,998 A | 4/1973 | Szpak et al. | |
| 3,857,626 A | 12/1974 | Rosenberger et al. | |
| 3,961,198 A | 6/1976 | Aungst | |
| 4,240,748 A | 12/1980 | Blanc et al. | |
| 4,282,425 A | 8/1981 | Chadima et al. | |
| 4,570,057 A | 2/1986 | Chadima et al. | |
| 4,734,773 A | 3/1988 | Ueda | |
| 4,743,773 A | 5/1988 | Katana et al. | |
| 4,766,300 A | 8/1988 | Chadima et al. | |
| 4,820,911 A | 4/1989 | Arackellian et al. | |
| 4,894,523 A | 1/1990 | Chadima et al. | |
| 4,929,053 A | 5/1990 | Muller-Stute et al. | |
| 4,969,037 A | 11/1990 | Poleschinski et al. | |
| 4,984,523 A | 1/1991 | Dehne | |
| 5,019,699 A | 5/1991 | Koenck | |
| 5,149,948 A | 9/1992 | Chisholm | |
| 5,177,346 A | 1/1993 | Chisholm | |
| 5,202,817 A | 4/1993 | Koenck | |
| 5,227,614 A | 7/1993 | Danielson et al. | |

(Continued)

FOREIGN PATENT DOCUMENTS

| | | |
|---|---|---|
| CN | 1426570 | 6/2003 |
| DE | 3737792 | 5/1989 |

(Continued)

OTHER PUBLICATIONS

U.S. Patent Office Notice of Allowance, for U.S. Appl. No. 10/911,989, (Jun. 3, 2009), 1-7.

(Continued)

*Primary Examiner* — Ahshik Kim

(57) ABSTRACT

An industrial reader is provided with an image formation system that is particularly adapted to read bar codes and two-dimensional symbols marked directly on objects. The image formation system includes illumination sources and illumination transmissive components that produce a combination of bright field and dark field illumination.

10 Claims, 10 Drawing Sheets

(56) References Cited

U.S. PATENT DOCUMENTS

| | | |
|---|---|---|
| 5,239,169 A | 8/1993 | Thomas |
| 5,258,606 A | 11/1993 | Chadima et al. |
| 5,291,009 A | 3/1994 | Roustaei |
| 5,309,277 A | 5/1994 | Deck |
| 5,313,373 A | 5/1994 | Bjorner et al. |
| 5,319,182 A | 6/1994 | Havens et al. |
| 5,331,176 A | 7/1994 | San't Anselmo et al. |
| 5,349,172 A | 9/1994 | Roustaei |
| 5,354,977 A | 10/1994 | Roustaei |
| 5,359,185 A | 10/1994 | Hanson |
| 5,367,439 A | 11/1994 | Mayer et al. |
| 5,374,817 A | 12/1994 | Bard et al. |
| 5,378,883 A | 1/1995 | Batterman et al. |
| 5,393,967 A | 2/1995 | Rice et al. |
| 5,406,060 A | 4/1995 | Gitin |
| 5,408,084 A | 4/1995 | Brandorff et al. |
| 5,414,251 A | 5/1995 | Durbin |
| 5,422,472 A | 6/1995 | Tavislan et al. |
| 5,430,285 A | 7/1995 | Karpen et al. |
| 5,434,618 A | 7/1995 | Hayashi |
| 5,442,247 A | 8/1995 | Tavislan et al. |
| 5,449,892 A | 9/1995 | Yamada |
| 5,461,417 A | 10/1995 | White et al. |
| 5,463,214 A | 10/1995 | Longacre et al. |
| 5,469,294 A | 11/1995 | Wilt et al. |
| 5,481,098 A | 1/1996 | Davis et al. |
| 5,484,994 A | 1/1996 | Roustaei |
| 5,500,516 A | 3/1996 | Durbin |
| 5,504,317 A | 4/1996 | Takahashi |
| 5,513,264 A | 4/1996 | Wang et al. |
| 5,514,858 A | 5/1996 | Ackley |
| 5,515,452 A | 5/1996 | Penkethman et al. |
| 5,532,467 A | 7/1996 | Roustaei et al. |
| 5,569,902 A | 10/1996 | Wood et al. |
| 5,576,527 A | 11/1996 | Sawanobori |
| 5,585,616 A | 12/1996 | Roxby et al. |
| 5,586,212 A | 12/1996 | McConica et al. |
| 5,591,955 A | 1/1997 | Laser |
| 5,598,007 A | 1/1997 | Bunce et al. |
| 5,606,160 A | 2/1997 | Tani et al. |
| 5,619,029 A | 4/1997 | Roxby et al. |
| 5,623,137 A | 4/1997 | Powers et al. |
| 5,654,533 A | 8/1997 | Suzuki et al. |
| 5,654,540 A | 8/1997 | Stanton et al. |
| 5,659,167 A | 8/1997 | Wang et al. |
| 5,684,290 A | 11/1997 | Arackellian et al. |
| 5,690,417 A | 11/1997 | Polidor et al. |
| 5,697,699 A | 12/1997 | Seo et al. |
| 5,703,348 A | 12/1997 | Suzuki et al. |
| 5,715,095 A | 2/1998 | Hiratsuka et al. |
| 5,723,868 A | 3/1998 | Hammond et al. |
| 5,734,153 A | 3/1998 | Swartz et al. |
| 5,743,633 A | 4/1998 | Chau et al. |
| 5,750,974 A | 5/1998 | Sasaki et al. |
| 5,756,981 A | 5/1998 | Roustaei et al. |
| 5,773,810 A | 6/1998 | Hussey et al. |
| 5,777,314 A | 7/1998 | Roustaei |
| 5,780,834 A | 7/1998 | Havens et al. |
| 5,783,811 A | 7/1998 | Feng et al. |
| 5,786,586 A | 7/1998 | Pidhirny et al. |
| 5,793,033 A | 8/1998 | Feng et al. |
| 5,811,784 A | 9/1998 | Tausch et al. |
| 5,821,518 A | 10/1998 | Sussmeier et al. |
| 5,834,754 A | 11/1998 | Feng et al. |
| 5,859,418 A | 1/1999 | Li et al. |
| 5,861,910 A | 1/1999 | McGarry et al. |
| 5,886,338 A | 3/1999 | Arackellian et al. |
| 5,894,348 A | 4/1999 | Bacchi et al. |
| 5,903,391 A | 5/1999 | Toshima |
| 5,907,148 A | 5/1999 | Iwafuchi et al. |
| 5,920,643 A | 7/1999 | White et al. |
| 5,923,020 A | 7/1999 | Kurokawa et al. |
| 5,949,057 A | 9/1999 | Feng |
| 5,949,763 A | 9/1999 | Lund |
| 5,969,321 A | 10/1999 | Danielson et al. |
| 5,979,763 A | 11/1999 | Wang |
| 5,984,494 A | 11/1999 | Chapman et al. |
| 5,992,751 A | 11/1999 | Laser |
| 6,011,586 A | 1/2000 | Lepior et al. |
| 6,022,124 A | 2/2000 | Bourn et al. |
| 6,033,090 A | 3/2000 | Seo |
| 6,034,379 A | 3/2000 | Bunte et al. |
| 6,036,095 A | 3/2000 | Seo |
| 6,039,254 A | 3/2000 | Froese-Peeck et al. |
| 6,039,255 A | 3/2000 | Seo |
| 6,042,012 A | 3/2000 | Olmstead et al. |
| 6,045,047 A | 4/2000 | Pidhirny et al. |
| 6,060,722 A | 5/2000 | Havens et al. |
| 6,065,678 A | 5/2000 | Li et al. |
| 6,073,852 A | 6/2000 | Seo |
| 6,105,869 A | 8/2000 | Scharf et al. |
| 6,119,939 A | 9/2000 | Schwartz et al. |
| 6,141,046 A | 10/2000 | Roth et al. |
| 6,158,661 A | 12/2000 | Chadima et al. |
| 6,164,544 A | 12/2000 | Schwartz et al. |
| 6,210,013 B1 | 4/2001 | Bousfield |
| 6,223,986 B1 | 5/2001 | Bobba et al. |
| 6,234,397 B1 | 5/2001 | He et al. |
| 6,247,645 B1 | 6/2001 | Harris et al. |
| 6,249,008 B1 | 6/2001 | Bunte et al. |
| 6,250,551 B1 | 6/2001 | He et al. |
| 6,260,763 B1 | 7/2001 | Svetal |
| 6,267,294 B1 | 7/2001 | Stern et al. |
| 6,283,374 B1 | 9/2001 | Fantone et al. |
| 6,330,974 B1 | 12/2001 | Ackley |
| 6,340,114 B1 | 1/2002 | Correa et al. |
| 6,341,878 B1 | 1/2002 | Chiang |
| 6,347,163 B2 | 2/2002 | Roustaei et al. |
| 6,347,874 B1 | 2/2002 | Boyd et al. |
| 6,352,204 B2 | 3/2002 | Hattersley et al. |
| 6,360,948 B1 | 3/2002 | Yang et al. |
| 6,371,374 B1 | 4/2002 | Schwartz et al. |
| 6,385,352 B1 | 5/2002 | Roustaei |
| 6,385,507 B1 | 5/2002 | Buijtels et al. |
| 6,394,349 B1 | 5/2002 | Shigekusa et al. |
| 6,405,925 B2 | 6/2002 | He et al. |
| 6,407,810 B1 | 6/2002 | Liu |
| 6,429,934 B1 | 8/2002 | Dunn et al. |
| 6,435,411 B1 | 8/2002 | Massieu et al. |
| 6,452,238 B1 | 9/2002 | Tsuboi |
| 6,491,223 B1 | 12/2002 | Longacre et al. |
| 6,505,778 B1 | 1/2003 | Reddersen et al. |
| 6,513,714 B1 | 2/2003 | Davis et al. |
| 6,542,238 B1 | 4/2003 | Tsuboi |
| 6,547,146 B1 | 4/2003 | Meksavan et al. |
| 6,575,367 B1 | 6/2003 | Longacre, Jr. |
| 6,581,838 B1 | 6/2003 | Meksavan et al. |
| 6,592,040 B2 | 7/2003 | Barkan |
| 6,595,422 B1 | 7/2003 | Doljack |
| 6,598,797 B2 | 7/2003 | Lee |
| 6,601,768 B2 | 8/2003 | McCall et al. |
| 6,607,128 B1 | 8/2003 | Schwartz et al. |
| 6,607,132 B1 | 8/2003 | Dvorkis et al. |
| 6,621,065 B1 | 9/2003 | Fukumoto et al. |
| 6,659,350 B2 | 12/2003 | Schwartz et al. |
| 6,661,521 B1 | 12/2003 | Stern |
| 6,681,037 B1 | 1/2004 | Koljonen |
| 6,689,998 B1 | 2/2004 | Bremer |
| 6,729,546 B2 | 5/2004 | Roustaei |
| 6,760,165 B2 | 7/2004 | Wulff et al. |
| 6,803,088 B2 | 10/2004 | Kaminsky et al. |
| 6,809,847 B2 | 10/2004 | McQueen |
| 6,831,290 B2 | 12/2004 | Mentzer |
| 6,832,725 B2 | 12/2004 | Gardiner et al. |
| 6,854,650 B2 | 2/2005 | Hattersley et al. |
| 6,855,650 B1 | 2/2005 | Bohannon et al. |
| 6,860,428 B1 | 3/2005 | Dowling et al. |
| 6,914,679 B2 | 7/2005 | Nettekoven et al. |
| 7,021,542 B2 | 4/2006 | Patel et al. |
| 7,025,271 B2 | 4/2006 | Dvorkis et al. |
| 7,025,272 B2 | 4/2006 | Yavid et al. |
| 7,025,273 B2 | 4/2006 | Breytman et al. |
| 7,025,572 B2 | 4/2006 | Miyagawa |
| 7,038,853 B2 | 5/2006 | Li et al. |

(56) References Cited

U.S. PATENT DOCUMENTS

| | | |
|---|---|---|
| 7,044,377 B2 | 5/2006 | Patel et al. |
| 7,090,132 B2 | 8/2006 | Havens et al. |
| 7,128,266 B2 | 10/2006 | Zhu et al. |
| 7,131,587 B2 | 11/2006 | He et al. |
| 7,159,764 B1 | 1/2007 | White et al. |
| 7,159,780 B2 | 1/2007 | Christian |
| 7,163,149 B2 | 1/2007 | He et al. |
| 7,180,052 B1 | 2/2007 | Barkan et al. |
| 7,187,825 B2 | 3/2007 | Lim et al. |
| 7,204,418 B2 | 4/2007 | Joseph et al. |
| 7,204,420 B2 | 4/2007 | Barkan et al. |
| 7,224,540 B2 | 5/2007 | Olmstead et al. |
| 7,225,989 B2 | 6/2007 | Zhu et al. |
| 7,240,844 B2 | 7/2007 | Zhu et al. |
| 7,253,384 B2 | 8/2007 | Barnes et al. |
| 7,267,282 B2 | 9/2007 | Zhu et al. |
| 7,270,274 B2 | 9/2007 | Hennick et al. |
| 7,278,575 B2 | 10/2007 | Zhu et al. |
| 7,281,661 B2 | 10/2007 | Zhu et al. |
| 7,296,749 B2 | 11/2007 | Massieu |
| 7,299,310 B2 | 11/2007 | Aschenbrenner |
| 7,306,155 B2 | 12/2007 | Hennick et al. |
| 7,314,173 B2 | 1/2008 | Philyaw et al. |
| 7,331,524 B2 | 2/2008 | Vinogradov et al. |
| 7,360,705 B2 | 4/2008 | Heinrich |
| 7,451,917 B2 | 11/2008 | McCall et al. |
| 7,490,774 B2 | 2/2009 | Zhu et al. |
| 7,520,434 B2 | 4/2009 | Jolivet et al. |
| 7,568,628 B2 | 8/2009 | Wang et al. |
| 7,604,174 B2 | 10/2009 | Gerst et al. |
| 7,617,984 B2 | 11/2009 | Nunnink |
| 7,793,017 B2 | 9/2010 | Gehring |
| 7,823,783 B2 | 11/2010 | Gerst et al. |
| 7,823,789 B2 | 11/2010 | Nunnink |
| 7,861,037 B2 | 12/2010 | McAvoy |
| 7,874,487 B2 | 1/2011 | Nunnink et al. |
| RE42,337 E | 5/2011 | Ward |
| 7,967,632 B2 | 6/2011 | Kiryu |
| 8,061,613 B2 | 11/2011 | Gerst et al. |
| 8,061,614 B2 | 11/2011 | Gerst et al. |
| 8,069,289 B2 | 11/2011 | Hafer et al. |
| 8,286,878 B2 | 10/2012 | Nunnink |
| 8,672,227 B2 * | 3/2014 | Nunnink ............... 235/472.01 |
| 2001/0027999 A1 | 10/2001 | Lee |
| 2002/0000472 A1 | 1/2002 | Hattersley et al. |
| 2002/0030094 A1 | 3/2002 | Curry et al. |
| 2002/0074403 A1 | 6/2002 | Krichever et al. |
| 2002/0080187 A1 | 6/2002 | Lawton |
| 2002/0096566 A1 | 7/2002 | Schwartz et al. |
| 2002/0104887 A1 | 8/2002 | Schlieffers et al. |
| 2002/0125322 A1 | 9/2002 | McCall et al. |
| 2002/0170970 A1 | 11/2002 | Ehrhart |
| 2003/0001018 A1 | 1/2003 | Hussey et al. |
| 2003/0029917 A1 | 2/2003 | Hennick et al. |
| 2003/0034394 A1 | 2/2003 | Gannon et al. |
| 2003/0058631 A1 | 3/2003 | Yoneda |
| 2003/0062413 A1 | 4/2003 | Gardiner et al. |
| 2003/0062418 A1 | 4/2003 | Barber et al. |
| 2003/0080187 A1 | 5/2003 | Piva et al. |
| 2003/0080189 A1 | 5/2003 | Patel et al. |
| 2003/0163623 A1 | 8/2003 | Yeung |
| 2004/0069855 A1 | 4/2004 | Patel et al. |
| 2004/0156539 A1 | 8/2004 | Jansson et al. |
| 2004/0217173 A1 | 11/2004 | Lizotte et al. |
| 2004/0238637 A1 | 12/2004 | Russell et al. |
| 2005/0029439 A1 | 2/2005 | Benedict |
| 2005/0045725 A1 | 3/2005 | Gurevich et al. |
| 2005/0047723 A1 | 3/2005 | Li |
| 2005/0087601 A1 | 4/2005 | Gerst et al. |
| 2005/0117144 A1 | 6/2005 | Greenway et al. |
| 2005/0180037 A1 | 8/2005 | Masterson |
| 2005/0199725 A1 | 9/2005 | Craen et al. |
| 2006/0027657 A1 | 2/2006 | Ninnink et al. |
| 2006/0027659 A1 | 2/2006 | Patel et al. |
| 2006/0032921 A1 | 2/2006 | Gerst et al. |
| 2006/0060653 A1 | 3/2006 | Wittenberg et al. |
| 2006/0131419 A1 | 6/2006 | Nunnink |
| 2006/0133757 A1 | 6/2006 | Nunnink |
| 2006/0266840 A1 | 11/2006 | Vinogradov et al. |
| 2007/0090193 A1 | 4/2007 | Nunnink et al. |
| 2007/0091332 A1 | 4/2007 | Nunnink |
| 2007/0152064 A1 | 7/2007 | Nunnink et al. |
| 2007/0206183 A1 | 9/2007 | Lebens |
| 2008/0170380 A1 | 7/2008 | Pastore |

FOREIGN PATENT DOCUMENTS

| | | |
|---|---|---|
| DE | 3931044 | 3/1991 |
| DE | 4003983 | 8/1991 |
| DE | 4123916 | 1/1992 |
| DE | 10026301 | 11/2001 |
| EP | 0185782 | 3/1989 |
| EP | 0356680 | 3/1990 |
| EP | 1158460 | 11/2001 |
| JP | S5362387 | 6/1978 |
| JP | 59163677 | 9/1984 |
| JP | 6134681 | 2/1986 |
| JP | 6318209 | 1/1988 |
| JP | 02100580 | 4/1990 |
| JP | 08287176 | 3/1991 |
| JP | H353784 | 3/1991 |
| JP | 04223583 | 8/1992 |
| JP | 06124361 | 5/1994 |
| JP | 6139398 | 5/1994 |
| JP | 07271890 | 10/1995 |
| JP | 08129597 | 5/1996 |
| JP | 8510053 | 10/1996 |
| JP | 0962831 | 3/1997 |
| JP | 10134133 | 5/1998 |
| JP | 11312898 | 11/1999 |
| JP | 2000-231600 | 8/2000 |
| JP | 2001043301 | 2/2001 |
| JP | 2001-307011 | 11/2001 |
| JP | 2002525644 | 8/2002 |
| JP | 2003503071 | 1/2003 |
| JP | 2004-127215 | 4/2004 |
| JP | 2005122355 | 5/2005 |
| JP | 200728088 | 1/2007 |
| JP | 2007546762 | 11/2007 |
| JP | 2008524709 | 7/2008 |
| WO | 9216909 | 10/1992 |
| WO | 9949347 | 9/1999 |
| WO | WO-0016073 | 3/2000 |
| WO | 0101118 | 1/2001 |
| WO | WO-0163258 | 8/2001 |
| WO | WO-0165469 | 9/2001 |
| WO | 02075637 | 9/2002 |
| WO | WO-2004006438 | 1/2004 |

OTHER PUBLICATIONS

U.S. Patent Office Notice of Allowance, for U.S. Appl. No. 10/911,989, (Oct. 17, 2008), 1-11.

U.S. Patent Office Notice of Allowance, for U.S. Appl. No. 10/911,989, 1-11.

U.S. Patent Office Notice of Allowance, for U.S. Appl. No. 10/911,989, (Feb. 17, 2007), 1-11.

U.S. Patent Office Notice of Allowance, for U.S. Appl. No. 10/693,626, (Dec. 21, 2009), 1-7.

U.S. Patent Office Notice of Allowance, for U.S. Appl. No. 10/693,626, (Feb. 22, 2008), 1-17.

U.S. Patent Office Notice of Allowance for U.S. Appl. No. 10/693,626, (Jul. 26, 2007), 1-9.

U.S. Patent Office Notice of Allowancefor U.S. Appl. No. 10/693,626, (Dec. 1, 2006), 1-10.

U.S. Patent Office Notice of Allowance for U.S. Appl. No. 10/693,626, (Jun. 15, 2006), 1-9.

U.S. Patent Office Notice of Allowance for U.S. Appl. No. 10/693,626, (Dec. 13, 2005), 1-9.

U.S. Patent Office Notice of Allowance for U.S. Appl. No. 10/693,626, (Jun. 28, 2005), 1-9.

(56) References Cited

OTHER PUBLICATIONS

U.S. Patent Office Notice of Allowance for U.S. Appl. No. 10/693,626, (Oct. 17, 2008), 1-11.
U.S. Patent Office Notice of Allowance, for U.S. Appl. No. 11/019,763, (Aug. 11, 2009), 1-6.
U.S. Patent Office Ex Parte Quayle Action for U.S. Appl. No. 11/019,763, (Apr. 16, 2009), 1-5.
U.S. Patent Office Notice of Allowance for U.S. Appl. No. 11/019,763, (Nov. 5, 2008), 1-6.
U.S. Patent Office Non-Final Office Action for U.S. Appl. No. 11/019,763, (Apr. 11, 2008), 1-6.
U.S. Patent Office Non-Final Office Action for U.S. Appl. No. 11/019,763, (Nov. 27, 2007), 1-8.
U.S. Patent Office Non-Final Office Action for U.S. Appl. No. 11/019,763, (Jun. 12, 2007), 1-7.
U.S. Patent Office Non-Final Office Action for U.S. Appl. No. 11/019,763, (Nov. 6, 2009), 1-6.
U.S. Patent Office Examiner Interview Summary for U.S. Appl. No. 11/257,411, (Aug. 25, 2009), pp. 1.
U.S. Patent Office Notice of Allowance for U.S. Appl. No. 11/257,411, (Aug. 25, 2009), 2-11.
International Preliminary Report on Patentability PCT/2006/041041, (Oct. 9, 2007).
PCT International Search Report, PCT/US2005/044452, Mar. 20, 2006.
German Patent and Trademark Office, Official Action, Application No. 102 91 122.3, Mar. 14, 2013.
German Patent and Trademark Office Official Action, Applicatio nNo. 11 2006 002 867.7, Jan. 23, 2013.
U.S. Patent Office Notice of Allowance, for U.S. Appl. No. 11/322,370, pp. 1-7 dated Dec. 2, 2009.
U.S. Patent Office Final Office Action, for U.S. Appl. No. 10/911,989, pp. 1-11 dated Sep. 26 2007.
U.S. Patent Office Notice of Allowance for U.S. Appl. No. 10/693,626, pp. 1-7 dated Dec. 21, 2009.
U.S. Patent Office Notice of Allowance, for U.S. Appl. No. 11/322,370, pp. 1-8, dated Jun. 30, 2009.
U.S. Patent Office Non-Final Office Action, for U.S. Appl. No. 11/322,370, pp. 1-11, dated Nov. 25, 2008.
U.S. Patent Office Examiner Interview Summary, for U.S. Appl. No. 11/322,370, pp. 1-2, dated Nov. 13, 2008.
U.S. Patent Office Final Office Action for U.S. Appl. No. 11/322,370, pp. 1-8, dated Sep. 5, 2008.
U.S. Patent Office Non-Final Office Action, for U.S. Appl. No. 11/322,370, pp. 1-7, dated Jan. 7, 2008.
U.S. Patent Office Examiner Interview Summary, for U.S. Appl. No. 11/322,370, p. 1 dated Dec. 30, 2007.
U.S. Patent Office Final Office Action, for U.S. Appl. No. 11/322,370, pp. 1-9, dated Oct. 4, 2007.
U.S. Patent office Non-Final Office Action for U.S. Appl. No. 11/322,370, pp. 1-10 dated Mar. 6, 2007.
U.S. Patent Office Notice of Allowance, for U.S. Appl. No. 11/014,478, 6 pages, dated Jul. 1, 2009.
U.S. Patent Office Non-Final Office Action for U.S. Appl. No. 11/014,478, pp. 1-8, dated Jan. 24, 2006.
U.S. Patent Office Notice of Allowance for U.S. Appl. No. 11/321.702, 7 pages, dated Jun. 25, 2009.
U.S. Patent Office Non-Final Office Action, for U.S. Appl. No. 11/321,702, pp. 1-7, dated Jun. 25, 2008.
U.S. Patent Office Notice of Allowance, for U.S. Appl. No. 12/573,402, 9 pages, dated Jun. 6, 2012.
U.S. Patent Office Non-Final Office Action, for U.S. Appl. No. 12/573.402, pp. 1-11, dated Apr. 5, 2011.
U.S. Patent Office Non-Final Office Action, for U.S. Appl. No. 12/573,402, pp. 1-8, Sep. 22, 2010.
U.S. Patent Office Non-Final Office Action, for U.S. Appl. No. 12/573,402, pp. 1-8, dated May 25, 2010.
U.S. Patent Office Non-Final Office Action, for U.S. Appl. No. 11/257,411, pp. 1-5, Nov. 6, 2009.
German Patent and Trademark Office, Office Action, Application No. 102 91 122.3 Apr. 29 2010.
State Intellectual Property Office, P.R. China, First Office Action, Application No. 200680048666.8, Mar. 19, 2010.
U.S. Patent Office Non-Final Office Action, for U.S. Appl. No. 10/911,989, pp. 1-11, dated Oct. 17, 2008,.
U.S. Patent Office Non-Final Office Action, for U.S. Appl. No. 10/911,989, pp. 1-11, dated Feb. 21, 2007.
U.S. Patent Office Final Office Action, for U.S. Appl. No. 10/693,626, pp. 1-17 dated Feb. 22, 2008.
U.S. Patent Office NonOFinal Office Action, for U.S. Appl. No. 10/693,626, pp. 1-9, dated Jul. 26, 2007.
U.S. Patent Office Final Office Action, for U.S. Appl. No. 10/693,626, pp. 1-10 dated Dec. 1, 2006.
U.S. Patent Office Non-Final Office Action, for U.S. Appl. No. 10/693,626, pp. 1-9, dated Jun. 15, 2006.
U.S. Patent Office Non-Final Office Action, for U.S. Appl. No. 10/693,626, pp. 1-9, dated Dec. 13, 2005.
U.S. Patent Office Non-Final Office Action, for U.S. Appl. No. 10/693,626, pp. 1-9, dated Jun. 28, 2005.
U.S. Patent Office Non-Final Office Action, for U.S. Appl. No. 10/693,626, pp. 1-11, dated Oct. 17, 2008.
Examiner Hiroshi Maeda. Japanese Patent Application No. 2008537812. Notification of Reasons of Rejection, English Translation, dated Feb. 28, 2012.
Cognex Corporation, "50mm Ring Light Image Formation System", for the In-Sight 5000 series ID Readers, 2006.
Cognex Corporation, "AcuReader/OCR", Accurate, Fast Wafer Identification, 1995-1996.
Cognex Corporation, "DataMan 6500 Series", Quick Reference 2004.
Cognex Corporation, "DataMan 6500 Series", Quick Reference Guide, Aug. 10, 2004.
Cognex Corporation, "DataMan 7500 Series Handheld Models", Cognex Machine Vision System and Machine Vision Sensors, 2009.
Cognex Corporation, "DataMan Handheld ID Readers", 2005.
Cognex Corporation, "Diffuse Ring Light Installation Instructions", InSight, 2006.
Indata Systems, "4410LDS—Hand Held Etched 2D Image Reader", 27 Fennell Street, Skaneateles, NY 13152, Internet: www.indatasys.com, Jan. 1, 2005, two pages.

* cited by examiner

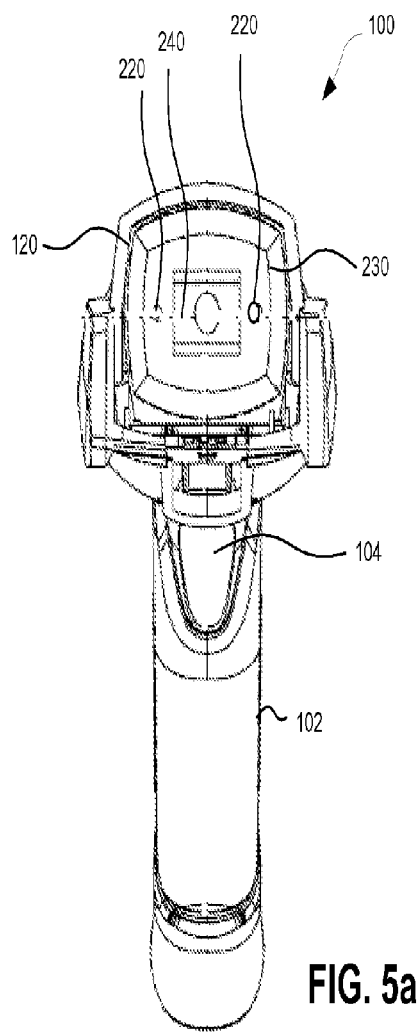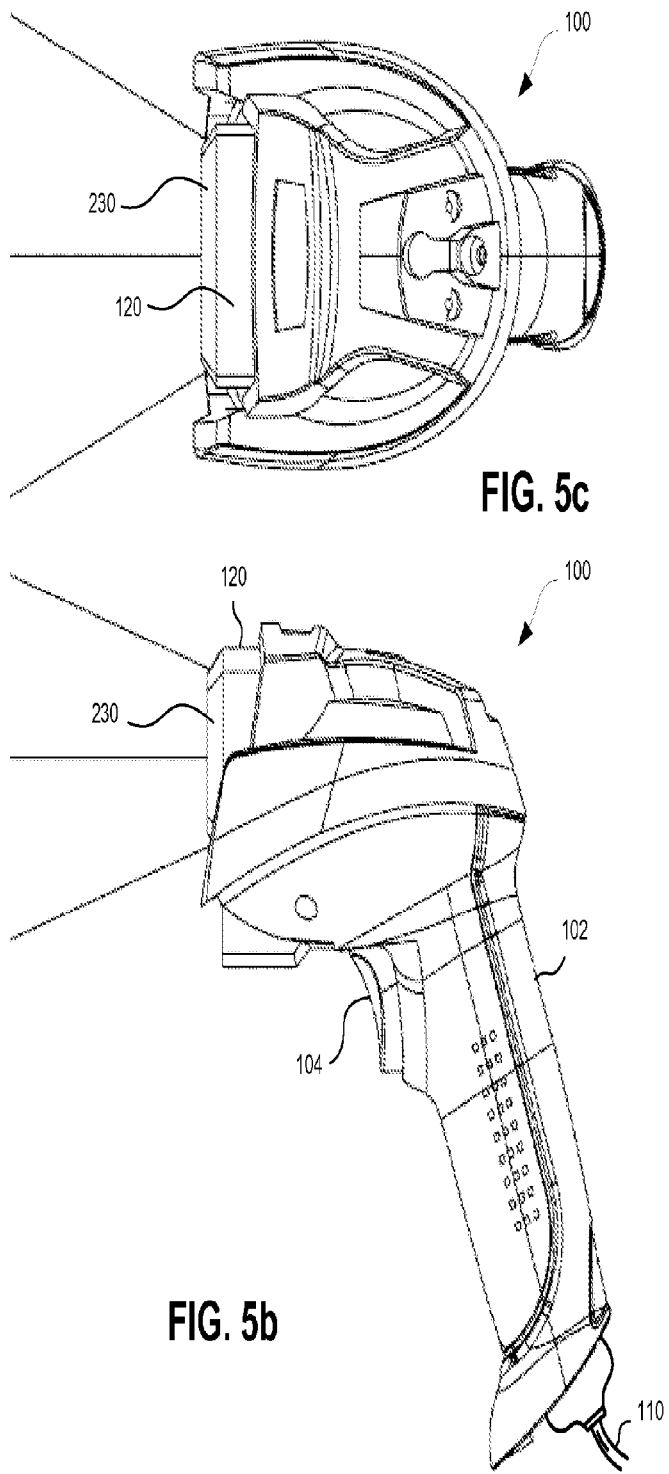
FIG. 5a  FIG. 5b  FIG. 5c

LOW PROFILE ILLUMINATION FOR DIRECT PART MARK READERS

CROSS REFERENCE TO RELATED APPLICATIONS

This application is a continuation of U.S. patent application Ser. No. 12/900,605, filed on Oct. 8, 2010, and entitled "Low Profile Illumination for Direct Part Mark Readers," which is a continuation of U.S. patent application Ser. No. 11/019,763, filed on Dec. 21, 2004, and entitled "Low Profile Illumination for Direct Part Mark Reader," each of which are hereby incorporated herein by reference.

FIELD OF THE INVENTION

This invention relates to the field of symbology readers used to read symbols marked directly on objects. Symbology readers of this type, commonly known as direct part mark readers, are an extension of hand-held and fixed-mount image-based symbology readers. A direct part mark reader requires a unique image formation system to produce an image of a symbol that can be successfully and consistently decoded.

BACKGROUND OF THE INVENTION

Two-dimensional symbols are used for most direct part marking applications because such symbols can encode a sufficient number of characters while maintaining a relatively compact size. Error correction schemes are typically included in most two dimensional symbologies, to improve the readability. The two-dimensional symbols are marked directly on the part or component using various methods, depending upon the material composition, part application, and environmental conditions. Common methods include dot peening, laser, and electro-chemical etch.

Symbols marked directly on a part or component are often difficult to read in comparison to symbols printed on labels. An image of a dot-peened, or etched mark often exhibits very low contrast using illumination or image formation systems of most image-based symbology readers. When a symbol is printed on an adhesive label, and applied to a part or component, or the part packaging, a typical image-based symbology reader can provide sufficient read rate. Industry trends, however, suggest that applications of direct part marking are nevertheless increasing.

Illumination of a symbol or mark is a primary concern when acquiring an image of the symbol to be read and decoded by an image-based symbology reader. Where symbols are printed on labels, or when marked directly on a part with a flat surface, high-angle "bright field" illumination is the type of illumination often used. Bright field illumination is a term of art for a type of illumination that produces a dark object in a bright background. Under bright field illumination, high-angle illumination strikes the object nearly perpendicularly, or at an angle not greater than 45 degrees from perpendicular. This type of illumination results in substantial illumination reflecting back toward the reader.

When a symbol or mark is etched or peened onto the surface of part or component, and the surface is rough or irregular, high-angle bright field illumination may not be appropriate. The irregular surface of the mark features will scatter as much light back to the reader as the surface of the background, resulting in indistinguishable features in the image. Low angle, "dark field" illumination has been shown to be suitable for certain direct part marking applications.

Under dark field illumination, low-angle illumination strikes the object at a low angle from the surface of the object, i.e., at an angle between 45 degrees and 90 degrees from perpendicular. Dark field illumination reflects away from the reader, with only random, irregular features of the mark or symbol on the surface of the object reflecting a portion of the illumination back into the reader. Further, certain reading applications may yield higher successful read rates when a combination of bright field and dark field illumination is used.

Industrial symbology readers are typically designed to provide bright field illumination from lighting sources integrated into the reader. When these readers are adapted to read direct part mark symbols, the use of removable light pipes and other adapters are used to redirect bright field illumination into a dark field mode. Accordingly, hand held readers known in the art that are used for direct part mark reading applications are configured exclusively for either bright field mode or dark field mode.

Accordingly, there is a need for a direct part mark reader with integrated illumination that provides variable and controllable illumination in both bright field and dark field modes.

SUMMARY OF THE INVENTION

An illustrative embodiment of the present invention provides an industrial identification mark reader with integrated illumination for both bright field and dark field modes. The reader has a housing with an imaging module that captures an image of a mark on an object placed before the reader. Within the housing, an illumination module has an array of selectively actuated illuminators for illuminating the mark or object. An integrated optical transmitter, supported by the housing, is aligned with, i.e., in optical cooperation with, the selectively actuated illuminators. The integrated optical transmitter has a dark field transmitter for transmitting dark field illumination, and bright field transmitters, for transmitting bright field illumination.

The integrated optical transmitter has a transparent window to provide a path for reflected illumination into the imager module, and to provide protection from the elements to the imager module, the illuminator module, and other internal components of the reader.

In an alternate illustrative embodiment, the integrated optical transmitter has a light pipe for the dark field transmitter, with a base having the bright field transmitter positioned within the light pipe. The alternate illustrative embodiment can be a removable component of the reader to permit field replacement for maintenance and repair and/or to permit the use of alternate light pipe designs for further varied illumination properties.

A third illustrative embodiment of the reader has a viewing port through which a user can view the field of view to which is visible to the imager.

BRIEF DESCRIPTION OF THE DRAWINGS

The invention description below refers to the accompanying drawings, of which:

FIG. 5a is a front plan view of a hand held industrial mark reader with an alternate illustrative embodiment of the present invention;

FIG. 5b is a left side plan view of a hand held industrial mark reader with an alternate illustrative embodiment of the present invention;

FIG. 5c is a top plan view of a hand held industrial mark reader with an alternate illustrative embodiment of the present invention;

DETAILED DESCRIPTION OF AN ILLUSTRATIVE EMBODIMENT

Figure 1:
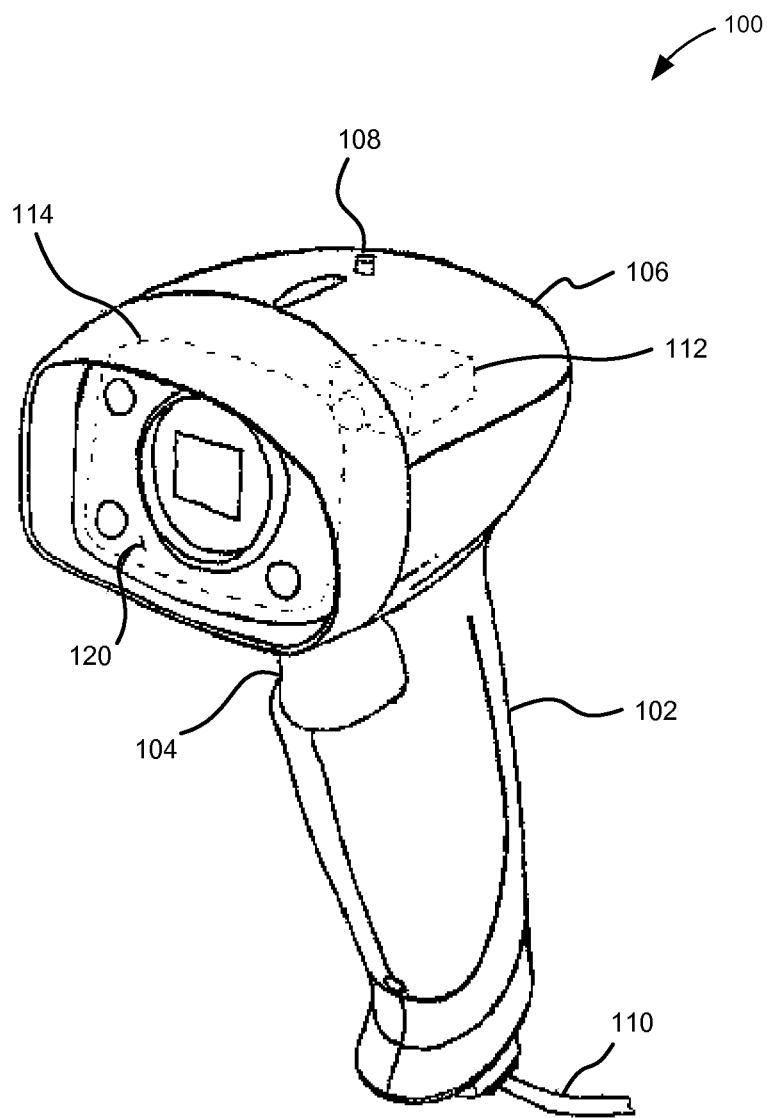
FIG. 1 is a perspective view of a hand held industrial mark reader with an embodiment of the present invention.

FIG. 1 shows an illustrative industrial mark reader 100 adapted for handheld operation, of the type that acquires an image of a mark or symbol, such as a one-dimensional or two-dimensional bar code, or data matrix symbol. An internal processor (not shown) performs an analysis of the acquired image, and decodes the mark or symbol to provide a character string of the encoded information.

The reader 100 shown in FIG. 1 has a grip portion 102 and a trigger 104 that can be actuated by a finger of the user to initiate the image acquisition and decoding function. A housing 106 contains an imager 112 (shown in phantom) that is connected to a processor (not shown). A status illuminator 108 provides visual indication of the status of the reader, such as to indicate a successful decode of an acquired image of a mark. A tether cord 110 provides electrical power to the reader 100, as well as a communication transmission path for the decoded character string of the encoded information, though it is contemplated that the reader 100 can be configured with battery power and wireless communication for complete portable flexibility.

The reader 100 provides illumination of the mark during the acquisition of an image of the mark through the emission of light from an illumination board 114 (shown in phantom). The reader 100 of the present invention includes an integrated optical transmitter 120, as shown in further detail in FIG. 2, to provide various types of illumination.

Figure 2:
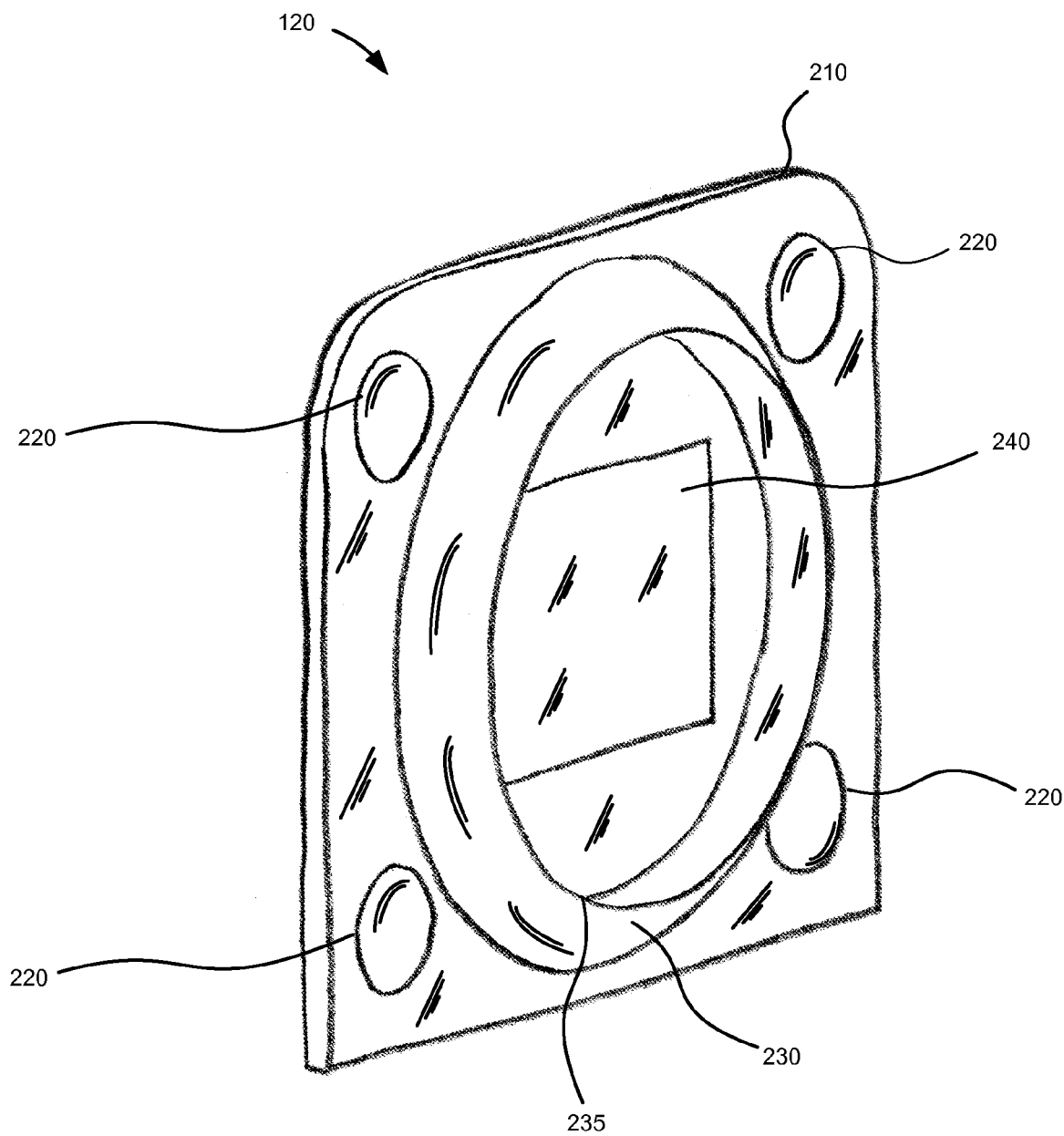
FIG. 2 is a perspective view of an illumination transmitter according to an embodiment of this invention.

Referring to FIG. 2, the integrated optical transmitter 120 is shown according to an illustrative embodiment of the present invention. The transmitter 120 is a molded plastic part that has a structural frame 210 that provides structural support by engaging in recessed channel of the housing 106 (not shown). One skilled in the art can appreciate a number of assembly techniques that can be used to assemble the various components of an opto-electronic device such as the exemplary reader 100. The transmitter 120 also includes a plurality of bright field illumination transmitters 220 that transmit bright field illumination from within the housing 106. The bright field transmitters 220 can be molded or fabricated to provide a lens capability and/or have diffusion properties to modify the angle and orientation of bright field illumination. The optical properties of the bright field transmitters 220 can be applied to either the front or the rear of the integrated transmitter 120 during fabrication, or both sides, as necessary to provide the lens capability.

The optical transmitter 120 also includes a dark field illumination transmitter 230 that transmits low angle dark field illumination from within the housing 106. The dark field illumination transmitter 230 consists of an extended barrel of light transmissive material terminating (in this embodiment) in an angled tip 235. As described further below, this tip is designed to cause internal reflection that projects a low-angle dark field illumination in the area directly in front of the reader 100. As noted above, such dark field illumination is typically provided at an angle greater than approximately 45 degrees from perpendicular.

The transmitter 120 also includes a window 240 that provides a transmission path for the reflected illumination into the housing 106 in the optical path of a field of view for the sensor module 112. The window 240 of the integrated optical transmitter 120 also provides physical protection from the elements for the several components of the reader that reside within the housing 106. Additionally, the window 240 can provide other optical functions, including filtering (for example, to reduce the effects of ambient illumination), and providing a telecentric view at the object by restricting the size of the opening.

Figure 3:
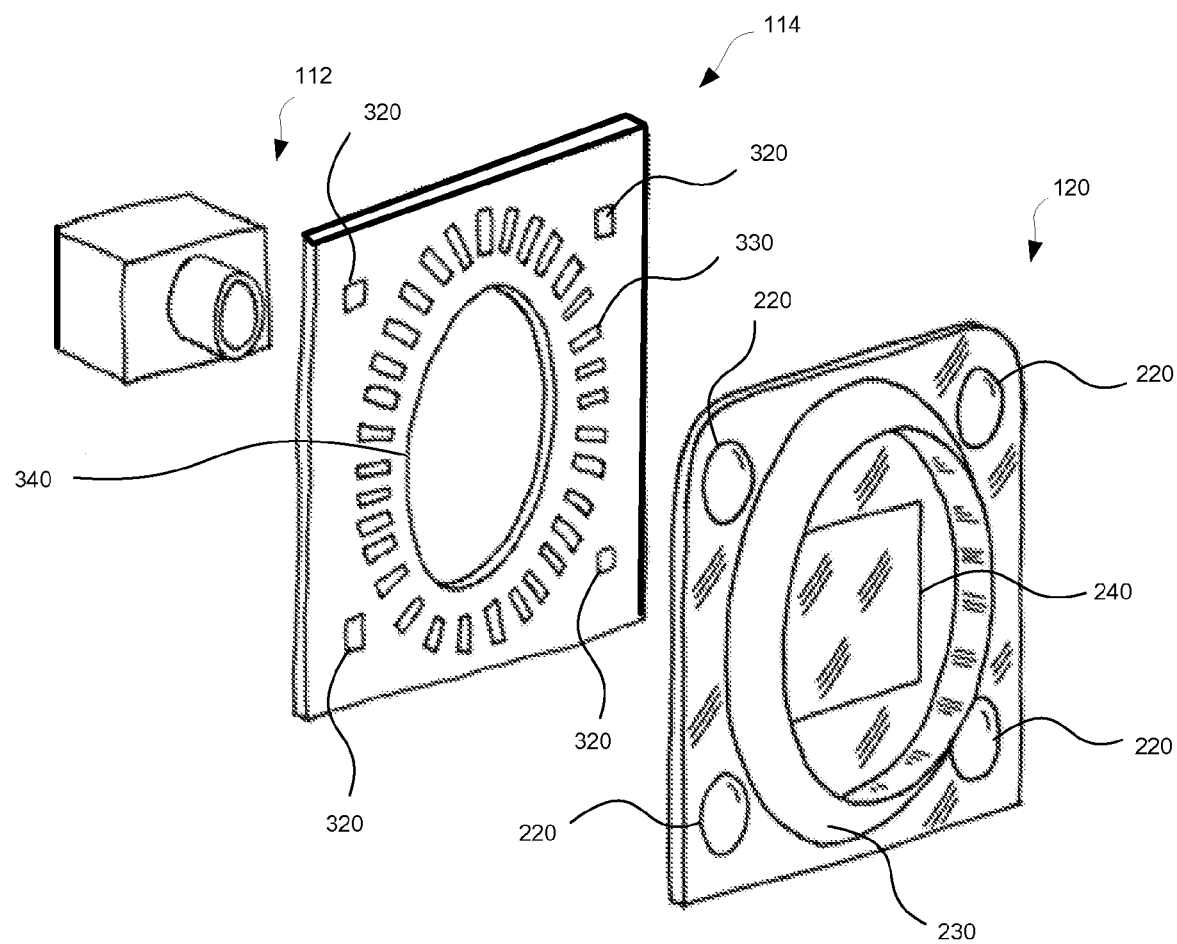
FIG. 3 is an exploded perspective view of the components of an industrial mark reader according to an embodiment of the present invention.

FIG. 3 shows a perspective exploded view of the integrated optical transmitter 120, illumination board 114 and imager module 112. The illumination board 114 has shown four bright field illuminators 320, each aligned with a bright field transmitter 220. The bright field illuminator 320 can be a surface mount LED that can be individually actuated by a processor controlling the illumination (not shown) concurrent to the acquisition of an image of a mark, if bright field illumination is desired during acquisition.

The illumination board 114 has shown an array of dark field illuminators 330 that are generally aligned with the dark field transmitter 230. Each of the dark field illuminators 330 can be surface mounted LEDs that can be individually actuated by a processor controlling the illumination (not shown) to provide dark field illumination in a variety of modes concurrent to the acquisition of an image of a mark, if dark field illumination is desired during acquisition. For example, various modes of illumination can be provided by the array of dark field illuminators 330 that are actuated in quadrants, as disclosed in co-pending U.S. patent application Ser. No. 10/911,989 filed Aug. 5, 2004, herein incorporated by reference. Control of various modes of illumination, and the synchronization of illumination to a specific acquisition, can be performed by a processor module (not shown) within the reader 100.

The illumination board 114 of the illustrative embodiment has a hole 340 that is aligned with the window 240 and the imaging module 112 to permit the transmission of reflected illumination from the mark into the imaging module 112 during image acquisition. Note that the size and shape of the hole 340 is sufficiently sized to not obscure reflected illumination from entering the imaging module 112.

The imaging module 112 is positioned behind the illumination board 112 in the exemplary embodiment, to receive reflected illumination to produce an image of the mark or symbol. The imaging module 112 has an area sensitive imaging array and an imaging lens. The imaging array can be a charge coupled device (CCD) or a complimentary metal oxide semiconductor (CMOS) device, or other imaging sensor known in the art. The imaging module 112 can also include focus adjustment mechanism to optimize the focus of an image projected onto the imaging array. Additionally, the imaging module can also include illumination to project on-axis bright field illumination toward the field of view, and/or to project an aiming illumination beam onto the field of view to provide the user with guidance for positioning the reader 100 during acquisition.

Coupled to the imaging module 112 is a processor unit (not shown) for receiving an acquired image from the imager module 112 to process and ultimately decode the image of the mark or symbol presented to the reader 100. The imager 112 can receive configuration instructions from the processing unit to set acquisition parameters, such as exposure duration, gain, offset, etc., in a manner commonly known in the art. The processor unit is coupled to the trigger 104 to initiate the illumination and image acquisition process when the trigger is actuated by the user.

Figure 4:
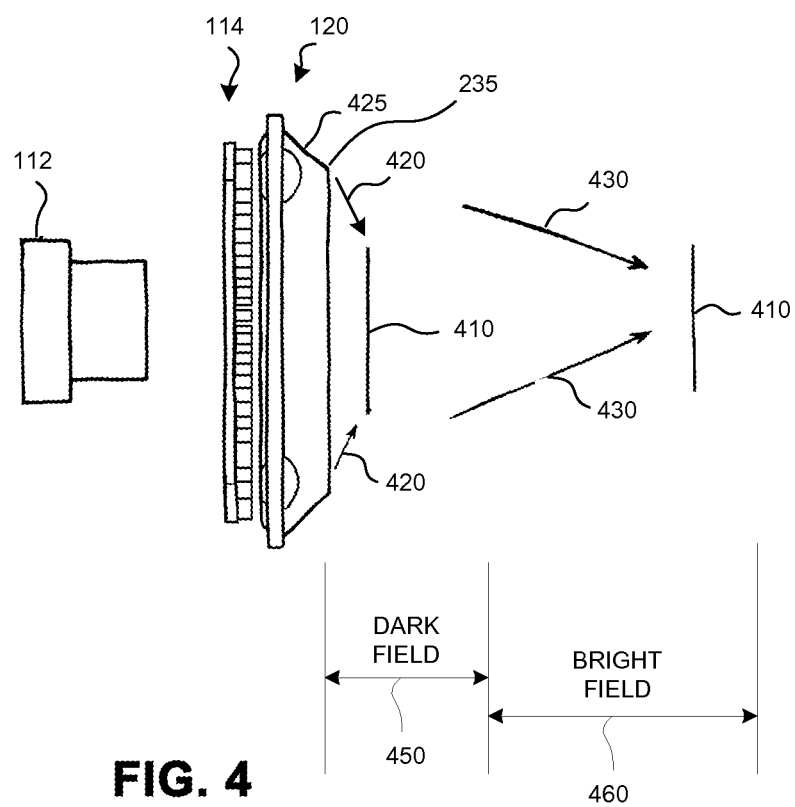
FIG. 4 is a side view of the components of an industrial mark reader according to an embodiment of the present invention.

FIG. 4 is a side view representation of the arrangement of the several components of the reader 100. The integrated optical transmitter 120 directs bright field and dark field illumination onto the mark or symbol 410. The illumination board 114 is positioned behind the integrated illumination transmitter 120, and the imaging module 112 is positioned behind both the integrated transmitter 120 and the illumination board 114.

When bright field illumination is used to illuminate a mark or symbol, the illumination projected onto the field of view has a high angle of incidence, e.g., less than 45 degrees from normal, as depicted as bright field illumination rays 430 in FIG. 4. Accordingly, bright field illumination mode 460 is attained when the reader 100 is positioned in the range of approximately 3 to 8 inches from the mark or symbol 410.

When dark field illumination is used to illuminate a mark or symbol, the illumination projected onto the field of view has a low angle of incidence, e.g., greater than 45 degrees from normal, as depicted as dark field illumination rays 420 in FIG. 4. Due to internal reflection caused by the angled portion 425 of the angled tip 235, low angle dark field illumination 420 exits from the transmitter 120. Accordingly, dark field illumination mode 450 is attained when the reader 100 is positioned in the range of approximately 0 to 3 inches from the mark or symbol 410.

FIGS. 5a, 5b, and 5c depict an alternate illustrative embodiment of the reader 100 according to the present invention. Referring to FIGS. 5a-5c, the reader 100 has a grip portion 102 and a trigger 104 that can be actuated by a finger of the user to initiate the image acquisition and decoding function. A tether cord 110 provides electrical power to the reader 100, as well as a communication transmission path for the decoded character string of the encoded information, though it is contemplated that the reader 100 can be configured with battery power and wireless communication for complete portable flexibility. In the alternate illustrative embodiment shown in FIGS. 5a-5c, the integrated optical transmitter 120 is partially shown in the reader 100. The front view depicted in FIG. 5a shows the bright field transmitters 220 and the window 240. The dark field transmitter 230, and additional description of the alternate illustrative embodiment of the integrated transmitter 120, is shown in the cross sectional view depicted in FIG. 6 and the following description.

Figure 6:
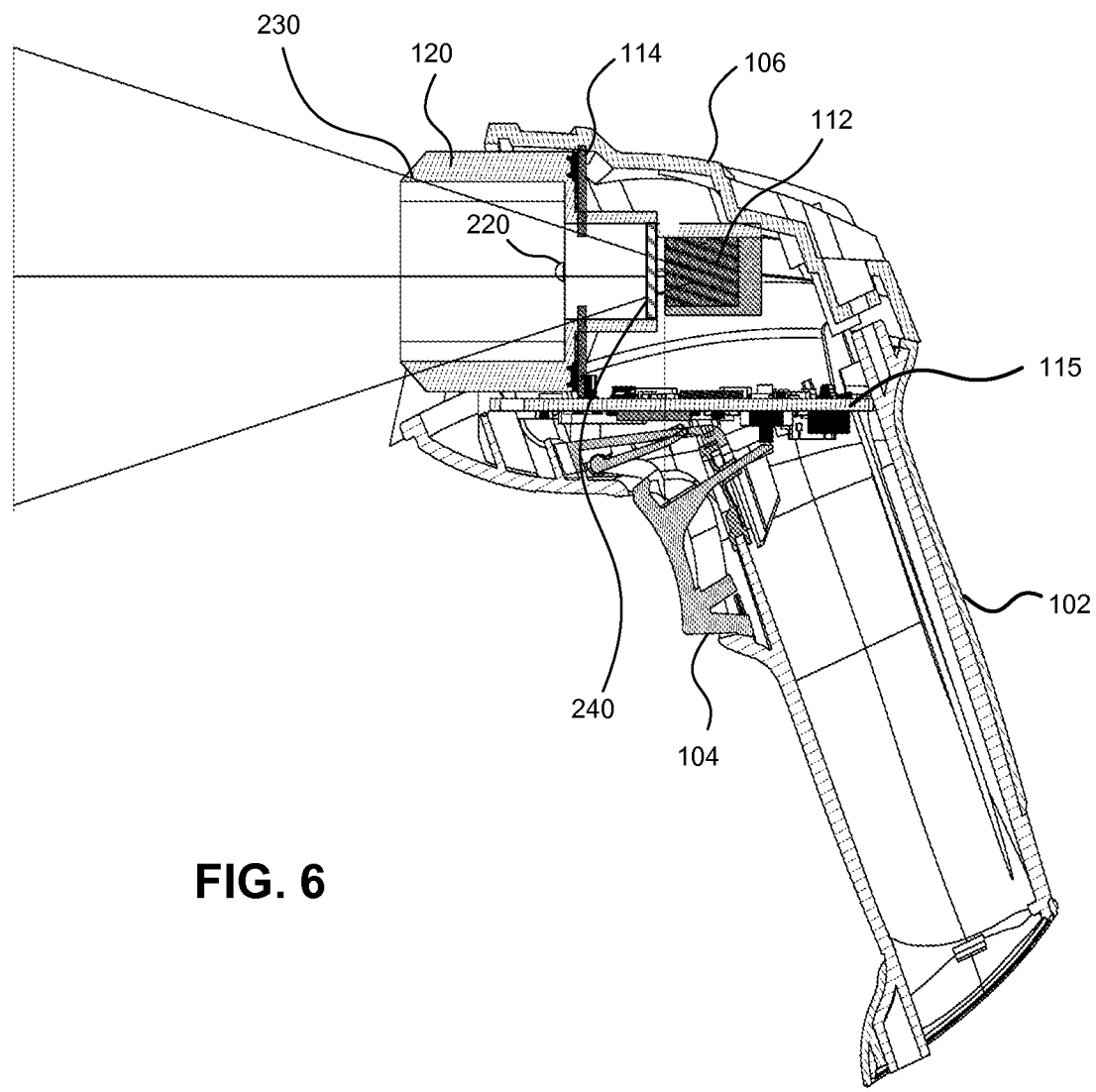
FIG. 6 is a cross section diagram of the components of an industrial mark reader according to an alternate illustrative embodiment of the present invention.

FIG. 6 shows a cross sectional side view of the alternate illustrative embodiment of the reader 100 according to the present invention. The housing 106 supports the positioning of the imager 112 and the illumination board 114. The processor module and related functional electronic components are mounted on the processor board 115. The grip portion 102 and the trigger 104 are functionally cooperative with the housing 106 and components of the processor board 115. The integrated optical transmitter 120, and particularly, the dark field transmitter 230, are elongated in this alternative illustrative embodiment so that the dark field transmitter 230 operates as a light pipe for dark field illumination. The bright field transmitter 220 and the window 240 are shown at the base of the light pipe portion of the transmitter 120, and positioned within the light pipe.

Figure 7:
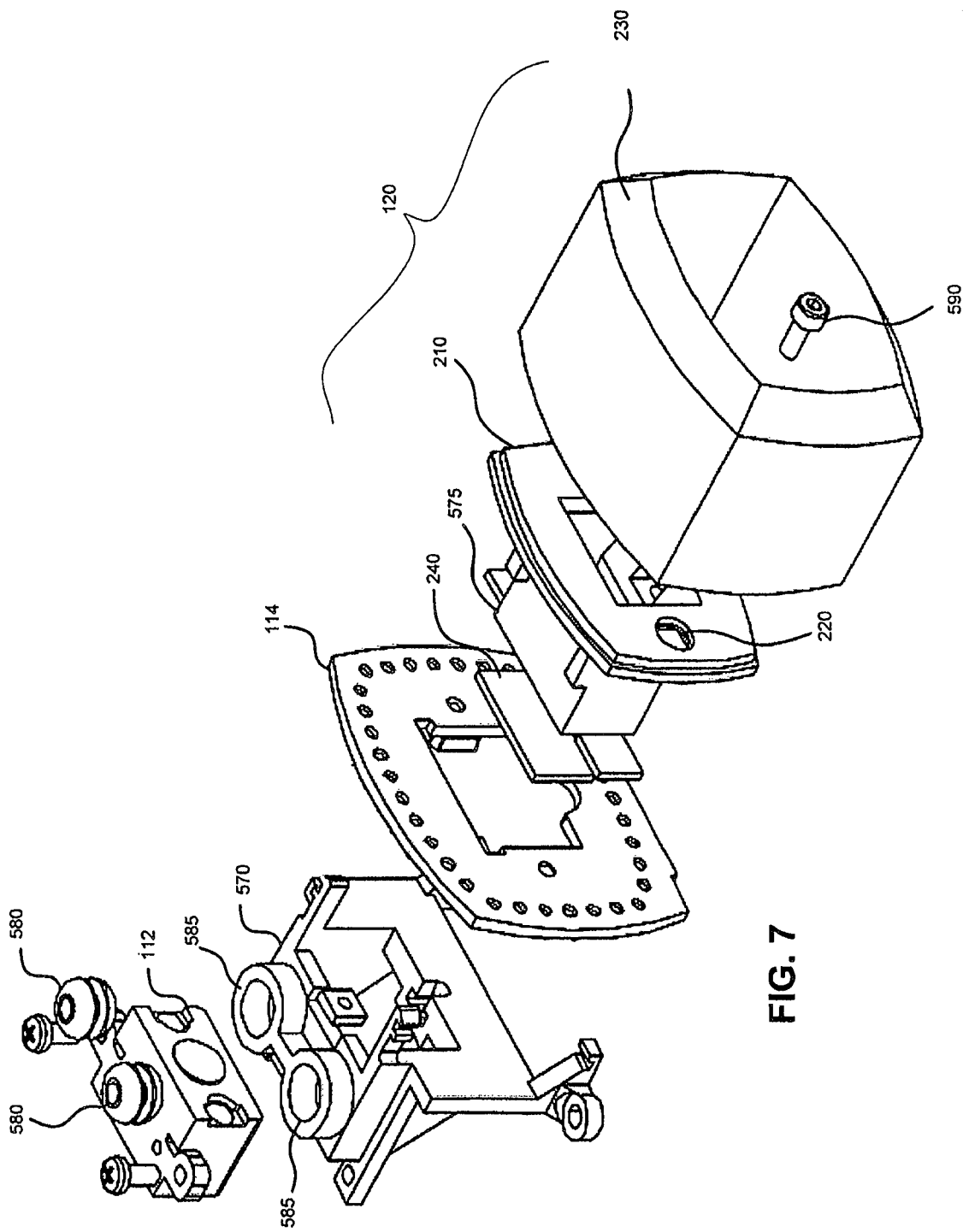
FIG. 7 is an exploded perspective view of the components of an industrial mark reader according to an alternate illustrative embodiment of the present invention.

FIG. 7 shows an exploded view of the integrated optical transmitter 120 according to the alternate embodiment of the present invention. The transmitter 120 can be fabricated from injection molded plastic components that are epoxied or thermosonically welded into a single, integrated optical component. The dark field transmitter 230 is attached to the structural frame 210, that has the bright field transmitters 220 molded therein. The window 240 is attached to the structural frame as shown, though optionally, the window 240 can be molded as an integrated component to the structural frame 210.

Also shown in FIG. 7 is the imager 112 mounted to a frame 570. Rubber grommets 580 are inserted into receptacles 585 that can receive protrusions from the housing (not shown) to provide vibration and mechanical shock isolation in the assembled reader.

The frame 570 receives the distal end member 575 of the optical transmitter 120 according to the alternate embodiment. A screw 590 can be used to secure the transmitter 120 into the frame 570. One skilled in the art will appreciate that various methods can be used to mechanically secure the described assembly in place to permit the operation of an industrial mark reader. The skilled artisan will also appreciate that a transmitter 120 described herein can be removable in the field by way of such methods of attachment.

Figure 8:
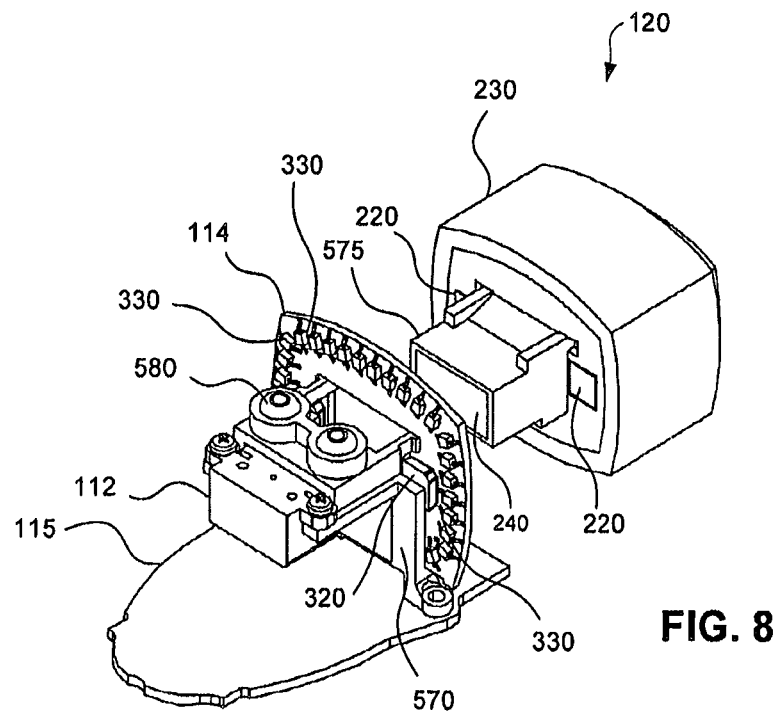
FIG. 8 is an exploded perspective view of the components of an industrial mark reader according to an alternate illustrative embodiment of the present invention.
Figure 9:
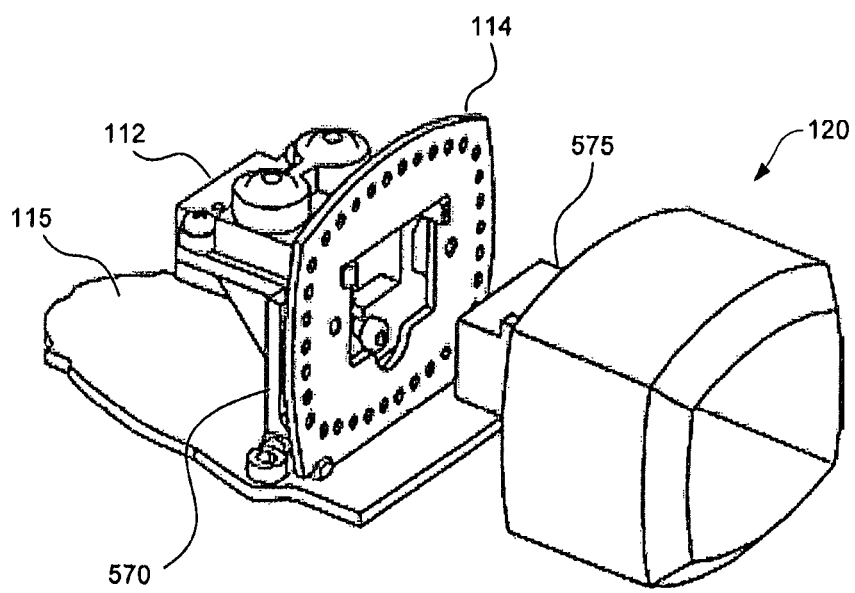
FIG. 9 is an exploded perspective view of the components of an industrial mark reader according to an alternate illustrative embodiment of the present invention.

FIG. 8 depicts the alternate illustrative embodiment of the reader 100 in a partially assembled exploded view from a rear perspective, and FIG. 9 shows the same embodiment from a front perspective. FIGS. 8 and 9 illustrate how the frame 570 is attached to the processor board. The optical transmitter 120 is shown in its fabricated, integrated form, depicting the bright field transmitters 220, the dark field transmitter 230, and the window 240. FIGS. 8 and 9 illustrate how the distal member 575 of the transmitter 120 is aligned for insertion into the frame 570. Further shown is the illumination board 114 with the array of dark field illuminators 330, and the bright field illuminators 320. The bright field illuminators 320 and the dark field illuminators 330 are surface mount LEDs that illuminate on the board side of the LED body as mounted on the board. The illumination board 114 is fabricated with holes at each LED location so that when the LED is energized, the illumination projects through the board. When the transmitter 120 is inserted into place, the bright field illuminators 320 align with the bright field transmitter 220, and the array of dark field illuminators 330 are aligned with the dark field transmitter 230.

The integrated optical transmitter 120 according to the illustrative embodiment is molded or fabricated with polymethyl methacrylate (PMMA) or polycarbonate. The optical properties of the transmitter 120 can be obtained through polished mold surfaces and/or post fabrication polishing of the transmitter 120.

Figure 10:
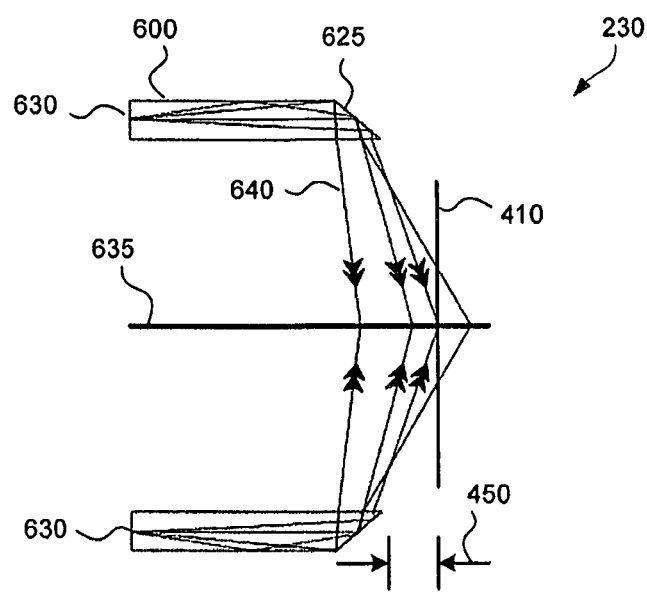
FIG. 10 is a cross section diagram of light pipe component of an industrial mark reader according to an alternate illustrative embodiment of the present invention, showing dark field illumination.
Figure 11:
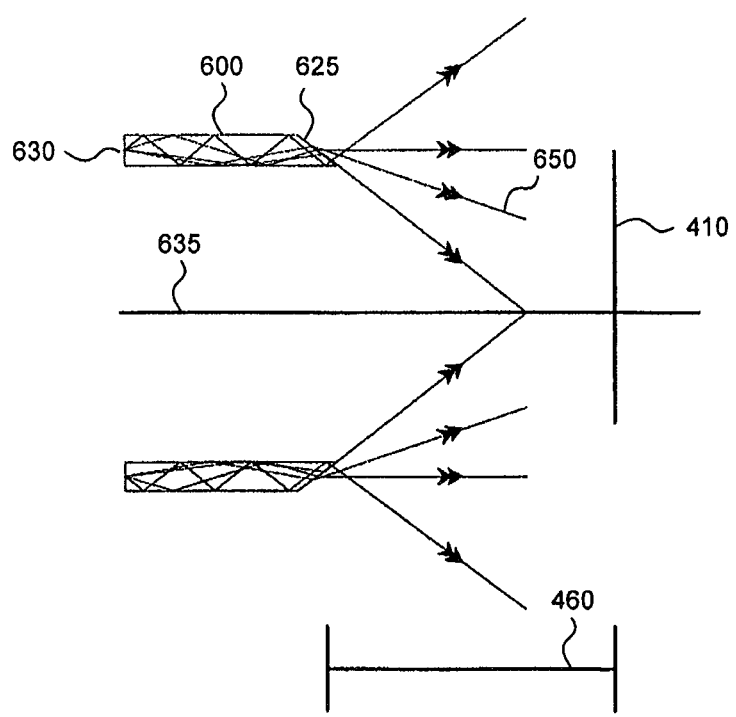
FIG. 11 is a cross section diagram of light pipe component of an industrial mark reader according to an alternate illustrative embodiment of the present invention, showing dark field illumination.

The integrated optical transmitter 120 of the alternate embodiment can produce illumination in both bright field and dark field modes, as described above. FIG. 10 is a cross sectional view of the dark field transmitter 230 according to the alternate illustrative embodiment. Illumination enters the transmitter at the face end 630 from the dark field illuminators 330 (not shown). The transmitter is a elongated light pipe 600 about the optical axis 635, with a tapered end 625. Dark field illumination rays 640 reflect from the tapered end 625 to project a dark field mode of illumination 450 when the reader is positioned in the range of approximately 0 to 3 inches from the mark or symbol 410. Additionally, by virtue of the elongated light pipe design, the dark field transmitter 230 will contribute to bright field illumination when the reader 100 is positioned in the bright field illumination mode 460, as shown in FIG. 11. Illumination from the dark field illuminators 330 (not shown) will enter the transmitter at the face end 630 at an angle that results in internal reflection over the length of the elongated light pipe 600. Some of the illumination will emit from the tapered end 625 as high angle bright field illumination rays 650.

An inherent difficulty with dark field illumination in most industrial mark readers is that the it is difficult to ensure that the mark or symbol 410 is in the field of view. The reader body obscures the mark or symbol when it is in dark field mode 450 from the user's view, and therefore, aiming and alignment of the reader is difficult. In an alternate embodiment of the present invention, a low profile reader is provided that permits direct observation of the mark or symbol by the user in dark field mode.

Figure 12:
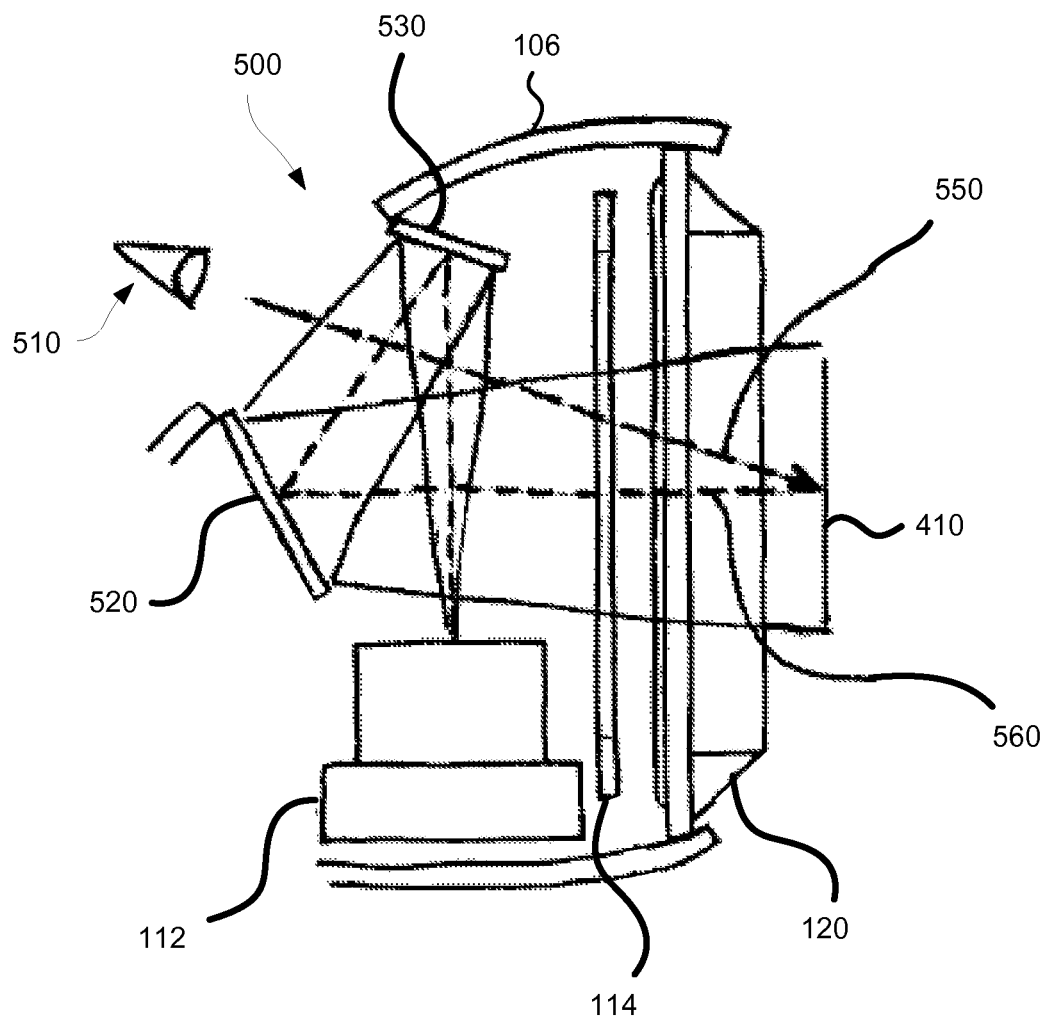
FIG. 12 is a cross section diagram of the components of an industrial mark reader according to a third illustrative embodiment of the present invention.

FIG. 12 depicts the reader 100 in a third alternate embodiment with an observation port 500. The reader 100 has an integrated illumination transmitter 120 and an illumination board 114 as previously described. The user 510 can view the mark or symbol 410 directly through the observation port 500, depicted as the line of sight 550 in FIG. 12. The reflected illumination 560 projects into the imaging module 112 by reflecting the illumination through a first mirror 520 and a second mirror 530.

The foregoing has been a detailed description of various embodiments of the invention. It is expressly contemplated that a wide range of modifications and additions can be made hereto without departing from the spirit and scope of this invention. For example, the number, position and relative placement of the bright field transmitters on the integrated optical transmitter is exemplary and a variety of such transmitters can be employed to perform bright field illumination on hand held image-based decoding methods herein. Further, additional functionality can be added to the optical transmitter 120, such as aiming optics to direct aiming illumination onto the field of view to provide guidance to a user during operation of the reader 100. Further still, sensor optics can be incorporated into the integrated transmitter 120 to permit the transmission and reception of electromagnetic signals to be used in conjunction with an auto-focus mechanism in the reader 100. Thus, improved or differing components can be employed within the teachings of this invention. Accordingly, this description is meant to be taken only by way of example, and not to otherwise limit the scope of this invention.

I claim:

1. An integrated optical transmitter for use in a direct part mark reader, the transmitter comprising:
    a structural frame that engages with a housing;
    a first set of illuminators that generate bright field illumination within the housing;
    a plurality of bright field illumination transmitters that transmit the bright field illumination from within the housing, such that the plurality of bright field illumination transmitters are molded within the structural frame;
    a second set of illuminators that generate dark field illumination within the housing;
    a dark field illumination transmitter that transmits low angle dark field illumination from within the housing such that the dark field transmitter is attached to the structural frame; and
    a window that provides a transmission path for the reflected illumination into the housing in an optical path of a field of view for a sensor module.

2. The integrated optical transmitter of claim 1 wherein the plurality of bright field illumination transmitters are offset from the optical axis.

3. The integrated optical transmitter of claim 1 wherein the bright field illumination transmitters comprise a molded or fabricated lens.

4. The integrated optical transmitter of claim 3 wherein the lens is adapted to modify the angle or orientation of the bright field illumination.

5. The integrated optical transmitter of claim 1 wherein the bright field illumination transmitters include optical properties applied to at least one of a front of the optical transmitter and both the front and a rear of the optical transmitter.

6. The integrated optical transmitter of claim 1 wherein the dark field illumination transmitter includes an angled distal tip, the angled distal tip adapted to cause internal reflection that projects the low-angle dark field illumination in the area directly in front of the reader.

7. The integrated optical transmitter of claim 1 wherein the bright field illumination transmitters are juxtaposed with the dark field illumination transmitter so that when the dark field illumination transmitter is optically aligned with the dark field illuminators, the bright field illumination transmitters are optically aligned with the bright field illuminators and the dark field illuminators are optically misaligned with the bright field illuminators.

8. The integrated optical transmitter of claim 1 wherein the dark field illuminators and the bright field illuminators are separately actuatable.

9. The integrated optical transmitter of claim 1 wherein the window comprises an optical filter.

10. The integrated optical transmitter of claim 6 wherein the dark field illumination transmitter is a light pipe.

* * * * *